3,326,770
GROWING MICROORGANISMS ON VOLATILE HYDROCARBONS
Vernon F. Coty, Trenton, N.J., assignor to Mobil Oil Corporation, a corporation of New York
No Drawing. Filed Dec. 3, 1963, Ser. No. 327,819
12 Claims. (Cl. 195—3)

This invention relates to an improved method for growing a microorganism on a volatile cyclic hydrocarbon. It further relates to a method of growing a micoorganism on a volatile cyclic hydrocarbon as the sole source of carbon and of coincidently oxidizing the latter to form an oxygenated cyclic compound.

The growing or culturing of microorganisms using a hydrocarbon as the sole source of carbon, is known. To secure rapid growth the hydrocarbon is introduced in the liquid state to a culture comprising the microorganism and a suitable nutrient such as an aqueous solution of mineral salts. It is found, however, that many of these microorganisms will not grow on certain liquid hydrocarbons; for example, many Pseudomonas will not grow on liquid aromatic compounds, such as the alkyl-substituted benzenes, which exert an inhibitory if not a toxic effect on their growth. It would be desirable to secure growth of these microorgnaisms on liquid aromatic and other cyclic compounds, particularly in a hydrocarbon-oxidizing system with which the invention is particularly concerned, not only for the sake of producing cells but also of making valuable oxygenated derivatives of the compounds.

According to the invention, it is proposed to initiate growth of a microorganism like Pseudomonas by introducing to it a volatile cyclic hydrocarbon in the vapor state under conditions in which the vapor is relatively stationary with respect to the microorganism, that is, a body of the vapor is maintained stationary with respect to the culture, although the latter may be agitated. If the vapor is moved past or through the culture as a flowing stream, as by being bubbled therethrough, growth does not take place. Rather, the vapor is employed as a generally stationary or quiescent phase disposed over the microorganism, the latter being dispersed in a conventional mineral nutrient which is exposed to oxygen and which comprises mineral salts dissolved in water, and as a consequence of this procedure cell growth ensues. After a certain minimum concentration of bacteria has been grown, say about $10^6$ to $10^7$ cells per ml. of culture medium, it has been found that growth will proceed, and at a more rapid rate, if the hydrocarbon introduction to the culture is switched from the vapor phase to the liquid phase. In accordance with this finding, the introduction of vaporoushydrocarbon is stopped and hydrocarbon in the liquid state is introduced to the culture, whereby growth continues at an increased rate.

The method described is useful for producing microorganisms in good yield. It enables hydrocarbons to be used as the sole source of carbon which otherwise could not be employed owing to their inhibitory effect. The method also provides a suitable way of starting the growth of a particular microorganism. Further, by proper selection of the hydrocarbon, a microbiological oxidation of the same can be brought about coincidently with the growth of the microorganism.

Considering the invention in more detail, the hydrocarbon to be used is, as indicated, a volatile cyclic hydrocarbon which is characterized by being a growth inhibitor when initially introduced in the liquid phase to the microorganism. The hydrocarbon may be an aromatic, or a saturated or unsaturated 5- or 6-membered cycloparaffin, and may have one or two or more rings. For the purpose of microbiologically oxidizing the hydrocarbon to form oxygenated cyclic compounds, the hydrocarbon is preferably an alkyl-substituted cyclic hydrocarbon having one, two, or more alkyl substituents, each of any suitable length, and comprising straight or branched chain radicals.

Alkyl-substituted aromatic hydrocarbons are preferred and include toluene, the various xylenes, mesitylene, ethylbenzene, p-cymene, the diethylbenzenes, and the isomeric propylbenzenes, butylbenzenes, amylbenzenes, hexylbenzenes, heptylbenzenes, and octylbenzenes. Though unsubstituted, benzene is suitable.

Included among the alkyl-substituted cycloparaffins are methylcyclopentane, the dimethyl- and trimethylcyclopentanes, ethylcyclopentane, the diethylcyclopentanes, the various propyl, butyl-, amyl, hexyl-, hepty-l, and octyl-cyclopentanes. Also included are the alkylcyclohexanes which are substituted in a manner according to the foregoing alkylcyclopentanes, and further including such compounds as the various tetramethylcyclohexanes, methylethylcyclohexanes, methylpropylcyclohexanes, and the like. Unsubstituted cyclopentane and cyclohexane are useful.

All of the foregoing hydrocarbons have suitable volatility characteristics enabling them to be introduced in the vapor phase to the microorganism at a practical rate for cell growth. For example, ethylbenzene, whose use is described in the examples below, has a vapor pressure of 0.37 p.s.i.a. at 100° F., and the other compounds have vapor pressures either somewhat greater than ethylbenzene or at least comparable thereto. Thus, benzene and toluene, whose use is also hereinafter described, respectively have vapor pressures of 3.22 and 1.03 p.s.i.a. at 100° F., while cumene has a comparable vapor pressure of about 0.19 p.s.i.a. at 100° F.

The microorganisms with which the invention is concerned comprise the genus Pseudomonas, particularly the hydrocarbon-oxidizing species thereof which constitute an important class of hydrocarbon oxidizers and which include such species as *Ps. aeruginosa, Ps. oleovorans, Ps. putida, Ps. fluorescens, Ps. boreopolis*, and *Ps. methanica*. Most of these are pigment producers, and it may be recorded that the pigment producers comprise a preferred class. Other Pseudomonads are *Ps. arvilla, Ps. dacunhae, Ps. desmolytica, Ps. rathonis*, and *Ps. cruciviae*.

The mineral nutrient, comprising mineral salts, is conventional. These salts furnish ammonium, nitrate or nitrite, potassium, ferrous or ferric, calcium, magnesium, phosphate and sulfate ions, as well as ions of trace elements such as zinc, manganese, copper, and molybdenum. As water is included in the nutrient mixture, most of these mineral salts will usually be present in sufficient quantity in ordinary potable water supplies. However, it is desirable to add the salts to the mixture to insure their presence in sufficient quantity for growth. Usually the mixture consists primarily of water, which may constitute 99%, or more, by weight of the liquid phase of the mixture, although it may also constitute a lesser portion, going down to 50% by weight of the liquid phase. Generally, any proportion of water heretofore employed in microbial oxidation of hydrocarbons may be used.

The culture mixture is maintained under conditions to insure optimum growth of the microorganism. The temperature, for example, should be maintained between about 20° and about 55° C., preferably in the neighborhood of 30° C. The pH is maintained near neutrality, namely, about 7.0, although it may range between about 5.5 and 8.5.

It is desirable to maintain the mixture in a condition of agitation as by shaking, or by using propellers, paddles, rockers, stirrers, or other means ordinarily employed for effecting agitation of a liquid mixture.

Both the microbial growth process and the microbial oxidation reaction require that oxygen be supplied to the mixture, and this is preferably done by employing reactors open to the atmosphere. With agitation of the mixture, the surface thereof exposed to the atmosphere is continuously renewed and oxygen is thereby taken up. If desired, oxygen may be supplied by bubbling oxygen or air through the mixture, thereby also providing the desired agitation.

Introduction of the hydrocarbon vapors to the microorganism may be carried out in any desired way, suitably by disposing a container of the liquid hydrocarbon over the culture and spaced above the surface thereof and allowing the ensuing vapors of the hydrocarbon to fill the space over the culture surface. It will be understood that the culture and the hydrocarbon container are suitably enclosed to prevent loss of vapors, and that provision is made for the introduction of oxygen or air. In the work described below, cultures in long-necked glass containers were stoppered with cotton plugs that had been wetted with liquid hydrocarbon, and the vapors of the latter were allowed to fill the space over the culture. A second unwetted plug disposed above the first was used to prevent loss of vapors to atmosphere and also to keep out contaminating microbes. The plugs were permeable to air.

To suit the requirements of commercial scale fermentations, it is feasible to grow the cells on the hydrocarbon vapors at one location, and then to transfer them to a second location and continue their growth on liquid hydrocarbons. It is also feasible to grow them on the hydrocarbon vapors in one location, and then to continue their growth on liquid hydrocarbon at the same location. The liquid hydrocarbon is usually the same as the vaporous one, but if desired it can be different; in the latter event it is chosen from those described.

It is found that aromatic hydrocarbons in particular may favor the production of protein-rich cells, that is, cells which synthesize proteins and store them intracellularly. Thus cells containing up to 55 or 60% by weight of protein may be grown. The cells may also synthesize and store vitamins or fats. Protein-rich cells are of particular importance as they may be useful as a source of protein material for the production or enrichment of food for animals or humans. The protein may be extracted from the cells, or in some cases the whole cells may be employed as a protein-supplying material. Yields of cells are at least 1 or 2 grams per liter of culture medium. On a hydrocarbon weight basis, the yield of cells may be at least 20% by weight, with the yield of extracellular products also at least 20% by weight.

As indicated, cells may be grown from volatile hydrocarbons which in the liquid phase are actually growth inhibitors. The invention enables this class of hydrocarbons, i.e., growth inhibitors, to be used to start cell growth, and after a minimum concentration of cells is present, the growth may continue using the hydrocarbon in the liquid phase. Such minimum concentration of cells is variable; preferably it is at least $10^6$ cells per ml. of culture medium, but it may be less, say $10^5$ or $10^4$ cells per ml. Concentrations of $10^6$ to $10^7$ are advantageous because at these levels the cells are just visible to the unaided eye.

Of particular interest is the fact that when the introduction of hydrocarbon is switched over to the liquid phase, oxidation products of the hydrocarbon are obtained which are not observed during the introduction of the vapors. In other words, the use of hydrocarbon in the vapor phase leads to cell growth but not to oxidation products, while the step of switching from the vapor to the liquid phase leads to oxidation products as well as to cell growth. The initial use of liquid hydrocarbon, as noted, inhibits cell growth, and does not lead to oxidation products.

The oxidation products or derivatives of the hydrocarbon feed are of considerable value and may be formed in substantial yields. For example, in the microbial oxidation of butylbenzene, wherein the hydrocarbon is first fed in the vapor state and then in the liquid state, there were formed from 1.6 g. of hydrocarbon consumed about 320 mg. of extracellular oxygenated hydrocarbon derivatives, and 320 mg. of cells; these derivatives comprised oxygenated hydrocarbons of several kinds, including aryl-substituted aliphatic acids like beta-phenyl propionic acid, hydroxy derivatives of the foregoing acids in which a hydroxy group may be substituted in the ring, amino derivatives of the foregoing acids in which an amino group may be present in the side chain, and other compounds. Derivatives of the foregoing types are obtainable when the liquid hydrocarbon is different from the vaporous one, as for example when the vaporous hydrocarbon is butylbenzene and the liquid one is propylbenzene.

The invention may be illustrated by the following examples.

*Example 1*

This example illustrates the growth of Pseudomonas on a vaporous hydrocarbon. A mixture of several species of Pseudomonas were isolated from soil and sprinkled on plates containing an agar-urea-mineral medium. Ammonium sulfate was present and with the urea constituted the nitrogen source. The plates were incubated in cans, with ethylbenzene vapors as the sole source of carbon. The vapors were introduced to each can so that the atmosphere over each culture comprised a trapped mass of ethylbenzene vapor. Growth was observed after about 24 hours, and one of the species elaborated in a greenish-colored pigment into the agar and had an ester-like odor; it was tentatively identified as *Ps. fluorescens*.

*Example 2*

An aqueous mineral salt mixture was prepared by dissolving the following salts in enough water to make one liter of solution:

|   | G. |
|---|---|
| Ammonium sulfate | 1.0 |
| Potassium dihydrogen phosphate | 3.0 |
| Sodium monohydrogen phosphate | 2.0 |
| Magnesium sulfate | 0.1 |
| Calcium chloride | 0.005 |
| Ferrous sulfate | 0.003 |
| Manganese sulfate | 0.001 |
| Sodium carbonate | 0.05 |
| Urea | 1.5 |

About 100 ml. of the solution was placed in a bottle open to atmosphere and inoculated with the green pigment-producing species noted in Example 1. The inoculation was done by picking the species from the plates of Example 1 with a needle and transferring the same to the nutrient solution. The inoculating amount was so small as to be invisible in the solution. Then 0.2 ml. of liquid ethylbenzene was added to the solution, and the mixture agitated. After agitation for 96 hours, no growth was observed to have taken place, as shown by the lack of any turbidity when the solution was compared with a control solution containing a visible amount of a bacteria. A duplicate test was run but failed to show any growth.

*Example 3*

In a test otherwise comparable to Example 2, the ethylbenzene, instead of being added in liquid form directly to the inoculated medium, was placed in a separate container through which air was bubbled, the ethylbenzene-laden air then being bubbled through the culture medium. No growth was observed after 96 hours.

*Example 4*

In a third test, otherwise comparable to Example 2, the inoculated medium was placed in a long-necked bottle and a cotton plug was placed in the neck of the bottle. Ethylbenzene was then applied to the plug so that its vapors filled the space over the culture medium. Spaced above the plug in the bottle neck was a second cotton plug which was kept dry and which served as a stopper. Both plugs were permeable to air. Excellent growth of the bacteria took place after only 24 hours of agitating the mixture.

*Example 5*

Cells were grown on a larger scale by placing one liter of the mineral nutrient of Example 2 in a long-necked flask and inoculating with the green pigment-producing species described above. A cotton plug was placed in the neck of the flask and one ml. of ethylbenzene applied to the same, after which a second dry plug was placed above the same. Cell proliferation was observed after about one day, and it continued during 24 additions of one ml. of the hydrocarbon to the plug, each such addition being made on a different day over a period of 6 to 7 weeks. Two days after the last addition, 1 ml. of the liquid hydrocarbon was added directly to the medium, and 6 days later 2 ml. of the liquid hydrocarbon were so added. All of the liquid hydrocarbon was utilized.

*Example 6*

Another run was carried out, starting in the same way as in Example 5, except that after only one addition of ethylbenzene was made to the cotton plug, and after cell proliferation was observed, the cell concentration was determined and found to range from $10^6$ to $10^7$ cells per ml. The next addition, made approximately 24 hours after the first, was done by introducing one ml. of liquid ethylbenzene directly to the culture medium, and it was found that cell growth continued without inhibition by the hydrocarbon. Thus, only two additions of ethylbenzene were made, one to the cotton plug and the other directly to the culture medium.

*Example 7*

The test of Example 6 was repeated several times, except that in place of ethylbenzene the added hydrocarbon was, respectively, benzene, toluene, propylbenzene and n-butylbenzene, each of which was metabolized. Of interest was the finding that benzene tended to be more rapidly used than the other hydrocarbons with toluene next, followed by ethylbenzene, propylbenzene, and then butylbenzene.

In another series of tests, cells were first grown on ethylbenzene vapors, as in Example 6, but instead of adding liquid ethylbenzene, liquid benzene was added in one test, liquid toluene in another, liquid propylbenzene in a third, and liquid butylbenzene in a fourth. In other words, the liquid addition was performed with a different hydrocarbon from the vapor addition. Metabolism continued on the liquid hydrocarbon in each case.

*Example 8*

A liter of the nutrient solution of Example 2 was placed in a long-necked bottle, inoculated as described in said example, and a cotton plug installed in the bottle neck. Then one ml. of butylbenzene was added to the plug, followed by twelve 1-ml. additions to the culture medium, each being made on a different day over a period of 6 weeks. These quantities of the hydrocarbon were all consumed by the cells, resulting in cell growth and extracellular product formation. The cells were recovered in an amount of 2.9 g., along with 0.5 g. of a lipoprotein material precipitated from the supernatant by means of hydrochloric acid. In addition, the supernatant liquid was extracted with ether and 200 mg. of a material was recovered which contained beta-phenyl acrylic acid and beta-phenyl propionic acid, identified by chromatographic techniques, and also several other hydrocarbon-derived acids. Following the ether extraction, the supernatant was further extracted with ethyl acetate and 84 mg. of product were recovered which comprised more polar oxygenated hydrocarbons than the foregoing and believed to include at least one aromatic compound having a carboxyl-containing side chain and at least one hydroxy group. None of these products were observed in the supernatant liquid of cultures maintained only on the vapors of the butylbenzene.

*Example 9*

Supernatant liquid prepared as in Example 8 was also examined by chromatographic techniques and found to contain ninhydrin-positive acids, that is, amino acids, and more particularly, aromatic alkanoic acids having an amino group as well as a carboxyl group on the side chain. These aromatic amino acids were not observed in the supernatant liquid of cultures maintained only on vapors of the hydrocarbon.

*Example 10*

The work of Example 8 was repeated, using instead of butylbenzene the following hydrocarbons: benzene, toluene, ethylbenzene, and propylbenzene. In each case, cell growth ensued, and extracellular products were formed comprising aromatic acids and oxygenated aromatic hydrocarbons having one or more hydroxy groups. In the case of ethylbenzene and propylbenzene, there was evidence of aromatic amino acids in the extracellular products.

It will be understood that the invention is capable of obvious variations without departing from its scope.

In the light of the foregoing description, the following is claimed.

1. Method for growing a microorganism on a volatile cyclic hydrocarbon as the sole source of carbon, said hydrocarbon being characterized by the fact that it is a growth inhibitor when initially introduced in the liquid state to said microorganism, which comprises introducing the said hydrocarbon in the vapor state to a culture comprising at least one Pseudomonas in the presence of oxygen and of a mineral nutrient said vapor being relatively stationary with respect to said culture, securing growth of said Pseudomonas, ceasing the addition of the hydrocarbon in vapor form, adding to said culture a hydrocarbon in the liquid state which if introduced thereto prior to said vaporous hydrocarbon would exert an inhibitory effect on growth, and growing said microorganism on said liquid hydrocarbon.

2. Method of claim 1 in which said vaporous and liquid hydrocarbons are the same.

3. Method of claim 1 in which said vaporous and liquid hydrocarbons are different.

4. Method of claim 1 in which said vaporous and liquid hydrocarbons are aromatic hydrocarbons.

5. Method of claim 4 in which said hydrocarbons are alkyl-substituted aromatic hydrocarbons.

6. Method for the microbial oxidation of a volatile cyclic hydrocarbon by Pseudomonas, said hydrocarbon being the sole source of carbon and being characterized by the fact that it is a growth inhibitor when initially introduced in the liquid state to said Pseudomonas, which comprises introducing said hydrocarbon in the vapor state to a culture comprising at least one Pseudomonas in the presence of air and of a mineral nutrient said vapor being relatively stationary with respect to said culture, growing said Pseudomonas on the vaporous hydrocarbon, then ceasing the addition of vaporous hydrocarbon, adding to said culture a hydrocarbon in the liquid state which if introduced thereto prior to said vaporous hydrocarbon would exert an inhibitory effect on growth, growing the Pseudomonas on the liquid hydrocarbon, and forming in said culture as a result of the addition of liquid hydrocarbon at least one extracellular oxygenated product of said liquid hydrocarbon which product would not be obtained in the absence of said step of introducing hydrocarbon in the liquid state.

7. Method of claim 6 in which said vaporous and liquid hydrocarbons are the same.

8. Method of claim 6 in which said vaporous and liquid hydrocarbons are different.

9. Method of claim 6 in which said vaporous and liquid hydrocarbons are aromatic hydrocarbons.

10. Method of claim 9 in which said hydrocarbons are alkyl-substituted aromatic hydrocarbons.

11. Method of claim 6 in which said Pseudomonas comprises a hydrocarbon oxidizer.

12. Method of claim 11 in which said Pseudomonas comprises a pigment producer.

References Cited

UNITED STATES PATENTS

| 2,697,062 | 12/1954 | Cramer | 195—3 |
| 3,057,784 | 10/1962 | Davis et al. | 195—28 |

A. LOUIS MONACELL, *Primary Examiner.*

D. M. STEPHENS, A. E. TANENHOLTZ,
*Assistant Examiners.*